(12) United States Patent
Young et al.

(10) Patent No.: US 7,024,690 B1
(45) Date of Patent: Apr. 4, 2006

(54) PROTECTED MUTUAL AUTHENTICATION OVER AN UNSECURED WIRELESS COMMUNICATION CHANNEL

(75) Inventors: Albert Young, Cupertino, CA (US);
Bob O'Hara, Santa Clara, CA (US);
Danny M. Nessett, Fremont, CA (US);
Joe Tsai, Saratoga, CA (US); BoFu Chen, Fremont, CA (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/561,088

(22) Filed: Apr. 28, 2000

(51) Int. Cl.
*H04L 9/00* (2006.01)
*H04K 1/00* (2006.01)

(52) U.S. Cl. ............... 726/5; 713/176; 380/270; 726/14

(58) Field of Classification Search ........... 713/150, 713/168, 176–181, 200–202; 380/270
See application file for complete search history.

(56) References Cited

U.S. PATENT DOCUMENTS

| | | | | |
|---|---|---|---|---|
| 4,612,413 A | * | 9/1986 | Robert et al. | 713/169 |
| 4,956,863 A | * | 9/1990 | Goss | 380/30 |
| 5,721,779 A | * | 2/1998 | Funk | 713/155 |
| 5,875,394 A | * | 2/1999 | Daly et al. | 455/411 |
| 5,995,624 A | * | 11/1999 | Fielder et al. | 713/169 |
| 6,304,969 B1 | * | 10/2001 | Wasserman et al. | 713/172 |
| 6,401,204 B1 | * | 6/2002 | Euchner et al. | 713/169 |
| 6,457,058 B1 | * | 9/2002 | Ullum et al. | 709/238 |
| 6,463,534 B1 | * | 10/2002 | Geiger et al. | 713/168 |
| 6,609,199 B1 | * | 8/2003 | DeTreville | 713/172 |
| 6,615,353 B1 | * | 9/2003 | Hashiguchi | 713/185 |
| 6,697,337 B1 | * | 2/2004 | Cafarelli et al. | 370/253 |
| 6,785,823 B1 | * | 8/2004 | Abrol et al. | 713/201 |
| 6,874,089 B1 | * | 3/2005 | Dick et al. | 713/201 |
| 2002/0124176 A1 | * | 9/2002 | Epstein | 713/186 |
| 2003/0177350 A1 | * | 9/2003 | Lee | 713/155 |
| 2005/0021959 A1 | * | 1/2005 | Tsushima et al. | 713/170 |

OTHER PUBLICATIONS

Bellare et al. "Entity authentication and key distribution." In Proc. of Crypto '93 (Aug. 1993) D. R. Stinson, Ed. vol. 773 of LNCSSpringer-Verlag, Berlinpp. 232249.*
J. Feigenbaum (Ed.): "Advances in Cryptography"—CRYPTO '91, LNCS 576, pp. 44-61, 1992.*
Davio et al. "Authentication Procedures." EUROCRYPT 1982: pp. 283-288.*

(Continued)

*Primary Examiner*—Christopher Revak (57) ABSTRACT

A process for mutual authentication of users and networks over an unsecured wireless communication channel. In one embodiment, sensitive information (e.g., passwords) is not communicated over the unsecured channel. Rather, hashed representations of user identifiers, passwords, etc., and randomly generated numbers are communicated between the client and the network during the log-in process. The representations may be encrypted with a one-way hash function such that it is not computationally feasible for an eavesdropper to decrypt. In one embodiment, the representation may be generated based on the user identifier, password and/or MAC address of a wireless LAN card.

49 Claims, 3 Drawing Sheets

OTHER PUBLICATIONS

Beker et al. "Message Authentication And Dymanic Passwords." EUROCRYPT 1987: pp. 171-175.*
Russell L. Brand: "Problems with the Normal Use of Cryptography for Providing Security on Unclassified Networks." CRYPTO 1989: pp. 30-34.*
Bird et al. "The KryptoKnight Family of Light-Weight Protocols for Authentication and Key Distribution", IEEE Transactions on Networking, vol. 3, Num 1, pp. 31-42, Feb. 1995.*
Frans, J. "HTTP Authentication: Basic and Digest Access Authentication." Jun. 1999.*
Joos. Richard R. "Mutual Authentication in Wireless Networks." Jun. 4, 1997.*
Ipng 1210. "Re: ND Asst for security Issue DHCPv6?" Jan. 18, 1996.*
Freier et al, "The SSL Protocol Version 3.0" Nov. 18, 1996, Transport Layer Security Working Group, p. 1-63.*
Zorn, "Microsoft PPP CHAP Extensions, Version 2", Jan. 2000, Network Working Group RFC 2759, p. 1-20.*
Zorn et al, "Microsoft PPP CHAP Extensions", Oct. 1998, Network Working Group RFC 2433, p. 1-20.*
Simpson, "PPP Challenge Handshake Authentication Protocol", Aug. 1996, Network Working Group RFC 1994, p. 1-12.*
Park et al, "Security protocol for IEEE 802.11 wireless local area network", 1998, Mobile Networks and Applications, p. 237-24.*
Schneier et al, "Cryptanalysis of Microsoft's Point-to-Point Tunneling Protocol", 1998, ACM $5^{th}$ Conference on Computer & Communications Security, p. 132-141.*
Paulson, "Inductive Analysis of the Internet Protocol TLS", Aug. 1999, ACM Transactions of Information and System Security vol. 2, No. 3, p. 332-351.*
Bull et al, "A nested mutual authentication protocol", Oct. 1999, ACM SIGOPS Operating System Review, vol. 33, Issue 4, p. 42-47.*

* cited by examiner

PROTECTED MUTUAL AUTHENTICATION OVER AN UNSECURED WIRELESS COMMUNICATION CHANNEL

FIELD OF THE INVENTION

The present invention pertains generally to the field of computer networking. More specifically, the present invention pertains to the field of computer network security.

BACKGROUND OF THE INVENTION

Computers have become an integral tool used in a wide variety of different applications, such as in finance and commercial transactions, computer-aided design and manufacturing, health-care, telecommunication, education, etc. Computers are finding new applications as a result of advances in hardware technology and rapid development in software technology. Furthermore, a computer system's functionality is dramatically enhanced by coupling stand-alone computers together to form a computer network. In a computer network, users may readily exchange files, share information stored on a common database, pool resources, and communicate via e-mail and via video teleconferencing.

In order to be connected to a network, a user typically has to go through a "log-in" process where the user proves himself as an authorized user of the network resources. Proving that a network user is allowed to access a network and/or network resources is a problem that has been addressed in the past by requiring a username and password to be entered by the requester, which is then sent over the network and verified to match the same information stored by a server on the network. When the channel is relatively secure, as it is in wired networks such as ethernet, that method works well. However, this method relies on an unstated assumption that the network over which the user sends the username and password is actually the network that the user is expecting to be using and that the network does not need to prove its identity.

That assumption fails when the network is not relatively secure. A wireless LAN ("Local Area Network") is an example of an unsecured network. In these networks, there is not an easily scrutinized physical connection upon which the user can rely. To provide the user with some assurance that the network that is being used is the one the user expects, some proof must be provided by the network of its identity. With this proof, the user can then determine whether it is prudent to offer the username and password to the network.

Further, in conventional wired networks, it is assumed that there are only authorized users and equipment connected to the network. Thus, it is relatively safe to send sensitive information (e.g., user identifiers, passwords, etc.) over a wired network "in the clear," i.e., unencrypted and not protected in any way. For wireless LANs, unfortunately, this cannot be guaranteed. In a wireless LAN, operations in this manner would expose sensitive information to casual eavesdroppers.

Therefore, what is needed is a method and system for protecting sensitive information over unsecured channels against eavesdroppers. What is further needed is a method and system for providing assurance that the network a user is trying to access is the one the user expects.

SUMMARY OF THE INVENTION

Accordingly, the present invention provides a method for mutual authentication of user and network over an unsecured channel, such as a wireless LAN. Particularly, in one embodiment, sensitive information (e.g., user access codes) is not communicated over the unsecured channel. Rather, hashed representations of the sensitive information are communicated between the client and the network during the log-in process. The representation is encrypted such that it is computationally infeasible for an eavesdropper to reconstruct the user identifier and/or secret access code. In this way, sensitive information can be sent over the unsecured channel.

According to the present invention, a one-way hash function, or message digest, is used for creating the hashed representations. In one embodiment, the hashed representation is generated based on the user identifier and/or secret access code. In another embodiment, the representation may be generated based on the user identifier, secret access code and/or the MAC address of the wireless LAN card that the user employs.

In furtherance to one embodiment of the present invention, the mutual authentication process begins with the user challenging the network to prove its identity. The client system (or the user's wireless LAN equipment) draws a random number and sends it to the network. The network responds by concatenating the user identifier, secret access code and random number and calculating the digest of the concatenation. The network also draws a second random number. Then, the network sends the second random number and the calculated digest to the client system. The user checks that the digest received from the network matches one that the user calculates from its local copy of the user identifier, secret access code and original random number. If the received digest and the locally calculated digest match, the network indeed holds a copy of the user identifier and secret access code, and has been authenticated to the user.

After the network is authenticated, in one embodiment, the client system concatenates the user identifier, secret access code and the second random number sent by the network and calculates a new digest of the concatenation. The client system then sends the calculated digest to the network. The network verifies the digest sent by the client against its locally calculated digest of the concatenation of the user identifier, secret access code and second random number. If the received digest and the locally calculated digest match, then user identity is authenticated. The user is then allowed to access the network resources.

BRIEF DESCRIPTION OF THE DRAWINGS

The accompanying drawings, which are incorporated in and form a part of this specification, illustrate embodiments of the present invention and, together with the description, serve to explain the principles of the invention.

DETAILED DESCRIPTION OF THE PREFERRED EMBODIMENTS

In the following detailed description, for purposes of explanation, numerous specific details are set forth in order to provide a thorough understanding of the present invention. However, it will be apparent to one skilled in the art that the present invention may be practiced without these specific details. In other instances, well-known structures and devices are not described in detail in order to avoid obscuring aspects of the present invention.

Some portions of the detailed descriptions which follow are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here and generally conceived to be a self-consistent sequence of steps of instructions leading to a desired result. The steps are those requiring physical manipulations of data representing physical quantities to achieve tangible and useful results. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "accessing", "determining", "generating", "associating", "assigning" or the like, refer to the actions and processes of a computer system, or similar electronic computing device. The computer system or similar electronic device manipulates and transforms data represented as electronic quantities within the computer system's registers and memories into other data similarly represented as physical quantities within the computer system memories into other data similarly represented as physical quantities within the computer system memories or registers or other such information storage, transmission, or display devices.

Figure 1:
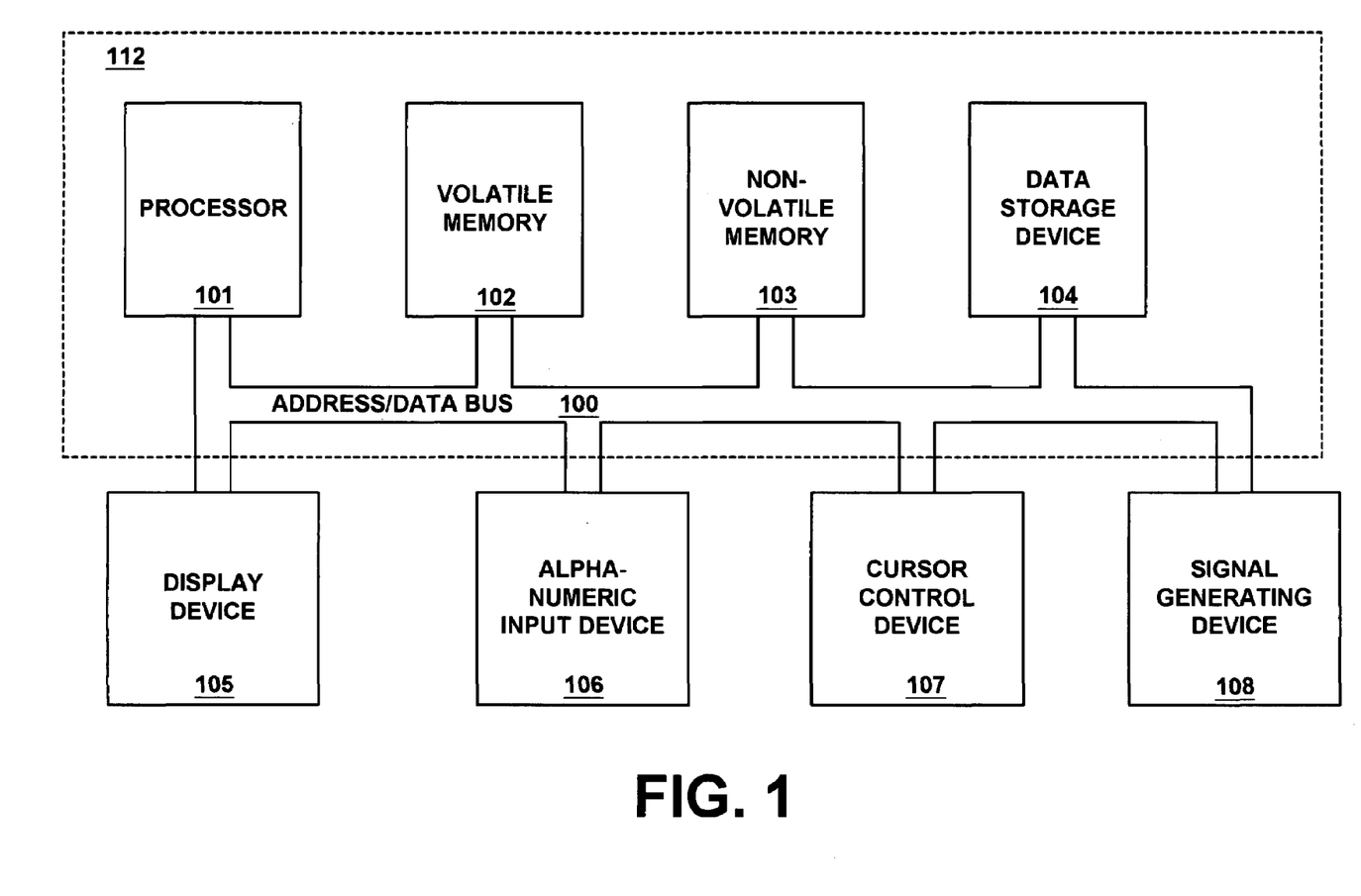
FIG. 1 illustrates an exemplary computer system platform upon which embodiments of the present invention may be practiced.

With reference to FIG. 1, portions of the present invention are comprised of computer-readable and computer executable instructions which reside, for example, in computer-usable media of a computer system. FIG. 1 illustrates an exemplary computer system 112 on which embodiments (e.g., process 300) of the present invention may be practiced. It is appreciated that system 112 of FIG. 1 is exemplary only and that the present invention can operate within a number of different computer systems including general purpose computer systems and embedded computer systems.

Computer system 112 includes an address/data bus 100 for communicating information, a central processor 101 coupled with bus 100 for processing information and instructions, a volatile memory 102 (e.g., random access memory RAM) coupled with the bus 100 for storing information and instructions for the central processor 101 and a non-volatile memory 103 (e.g., read only memory ROM) coupled with the bus 100 for storing static information and instructions for the processor 101. Computer system 112 also includes a data storage device 104 ("disk subsystem") such as a magnetic or optical disk and disk drive coupled with the bus 100 for storing information and instructions. Data storage device 104 can include one or more removable magnetic or optical storage media (e.g., diskettes, tapes) which are computer readable memories. Memory units of system 112 include volatile memory 102, non-volatile memory 103 and data storage device 104.

Computer system 112 can further include an optional signal generating device 108 (e.g., a wireless network interface card "NIC") coupled to the bus 100 for interfacing with other computer systems. Also included in computer system 112 of FIG. 1 is an optional alphanumeric input device 106 including alphanumeric and function keys coupled to the bus 100 for communicating information and command selections to the central processor 101. Computer system 112 also includes an optional cursor control or directing device 107 coupled to the bus 100 for communicating user input information and command selections to the central processor 101. An optional display device 105 can also be coupled to the bus 100 for displaying information to the computer user. Display device 105 may be a liquid crystal device, other flat panel display, cathode ray tube, or other display device suitable for creating graphic images and alphanumeric characters recognizable to the user. Cursor control device 107 allows the computer user to dynamically signal the two dimensional movement of a visible symbol (cursor) on a display screen of display device 105. Many implementations of cursor control device 107 are known in the art including a trackball, mouse, touch pad, joystick or special keys on alphanumeric input device 106 capable of signaling movement of a given direction or manner of displacement. Alternatively, it will be appreciated that a cursor can be directed and/or activated via input from alphanumeric input device 106 using special keys and key sequence commands.

Figure 2:
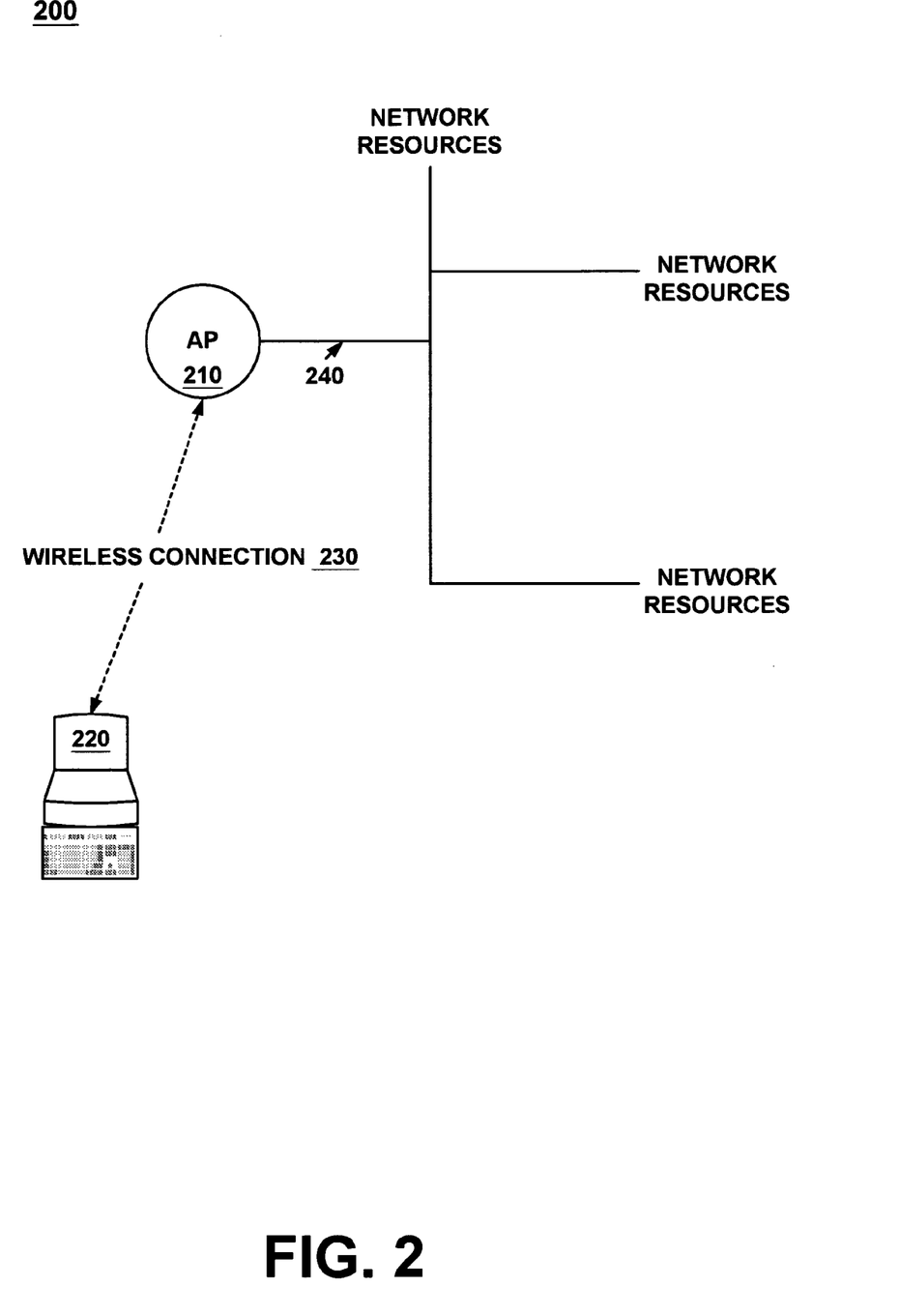
FIG. 2 is a graphical representation of an exemplary wireless network in which embodiments according to the present invention may be practiced.

Embodiments of the present invention, a method and system for mutual authentication of users and networks over an unsecured communication channel, may be practiced in a wireless local area network (LAN) environment. FIG. 2 illustrates an exemplary wireless network 200 in which embodiments of the present invention may be practiced. As illustrated, wireless network 200 includes an access point 210 that is coupled to a wireless client computer system 220 via a wireless connection 230. There are many techniques for implementing wireless connection 230, including infrared transmission, spread spectrum radio transmission, narrowband radio transmission, or some other technology that does not require a physical connection between the client system and the access point. Access point 210 may be implemented with a computer system (e.g., computer 112).

In the embodiment as illustrated in FIG. 2, access point 210 contains and/or has access to a database of user information including account names, secret access codes (e.g., account passwords), MAC ("Medium Access Control") addresses associated with each account, etc. In the present embodiment, the access point 210 is coupled to a number of network resources (e.g., file servers, printers, Internet gateways, etc.) via connection 240, and determines the access privileges of the wireless client system 220. A user desiring to access these network resources must first complete a "log in" procedure. That is, the user has to prove to the access point 210, or other devices within network 200, that the user is indeed authorized to access the network resources. In conventional wired networks where communication is relatively secure, a user may send user identifiers and secret access codes to the network without any encryption. However, in wireless LAN 200, user identifiers and secret access codes can be easily intercepted by casual eavesdroppers and intruders. Accordingly, an embodiment of the present invention provides a "log in" procedure that does not require sending sensitive information "in the clear."

The "log in" procedure of the present embodiment begins with the user challenging the access point 210 to prove its identity. Under control of the user, the client system 220 draws a random number and sends it to the access point 210. The client system 220 also sends a user identifier to the access point 210. In one embodiment, the user identifier may be a user identifier or the MAC address of the user's wireless LAN equipment.

After receiving the random number and the user identifier, the access point 210 responds by looking up the secret access code that corresponds to the user identifier. Access point 210 then concatenates the user identifier, secret access code and random number, and calculates the digest of the concatenation. In the present embodiment, a one-way hash function (e.g., SHA-1 or MD-5) is used for calculating the digest of the concatenation. The access point 210 also draws a second random number. Then, the access point 210 sends the second random number and the calculated digest to the client system 220.

The client system 220, upon receiving the network calculated digest, verifies that the digest received from the access point 210 matches the one that the client computer system 220 calculates from its local copy of the user identifier, secret access code and original random number. If the network calculated digest and the locally calculated digest match, the access point 210 indeed holds a copy of the user identifier and secret access code. As such, the access point 210 is successfully authenticated.

After the access point 210 is authenticated, in one embodiment, the client system 220 concatenates the user identifier, secret access code and the second random number and calculates a new digest from the concatenation. The client system 220 then sends the client calculated digest to the access point 210. The access point 210 verifies the digest sent by the client system 220 against its locally calculated digest of the concatenation of the user identifier, secret access code and second random number. If the received digest and the locally calculated digest match, then the user's identity is authenticated. The user is then allowed to access the network resources.

Figure 3:
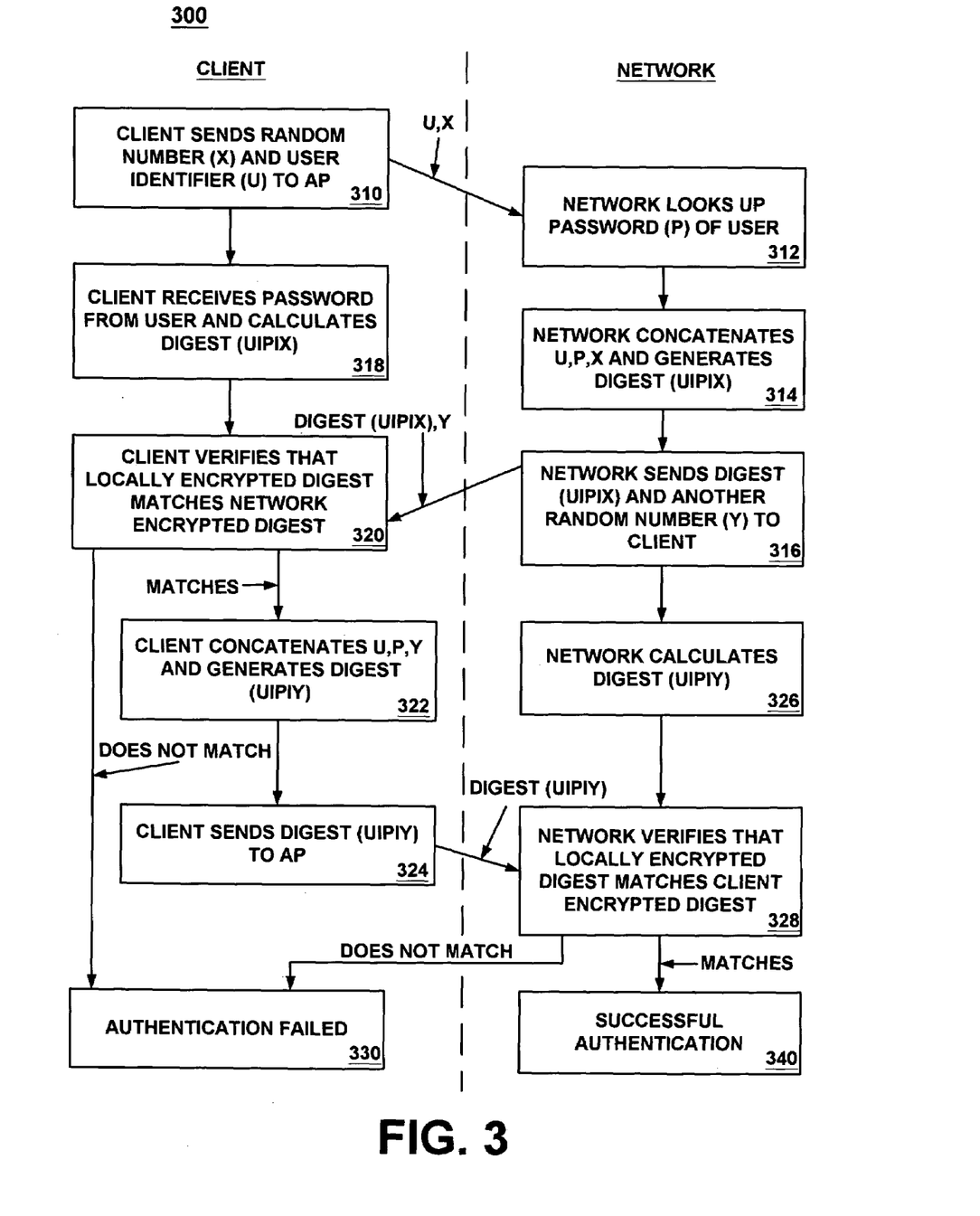
FIG. 3 is a flow chart diagram illustrating steps of a "log in" process over an unsecured channel where the user and the network are mutually authenticated in accordance with one embodiment of the present invention.

FIG. 3 is a flow diagram illustrating steps of a "log in" process 300 performed by a client computer system (e.g., system 220) and a network in accordance with one embodiment of the present invention. "Log in" process 300 begins at step 310 where the client computer system draws a random number, X, and sends it to the network. In the illustrated embodiment, the client computer system also sends a user identifier (e.g., account name), U, to the network. In another embodiment, it may not be necessary for the client system to send the user identifier to the network. User identifier may be discerned from the MAC address of the wireless LAN equipment of the client computer system.

At step 312, upon receiving the random number, the network responds by looking up user information within its logon database. In the present embodiment, user information such as account names, passwords, MAC addresses, etc., are cross-indexed within the logon database. Therefore, once a user identifier (e.g., account name) or MAC address is known, the corresponding password, P, can be readily determined.

At step 314, the network determines a concatenation (U|P|X) of the user identifier U, password P and the random number X and calculates a message authentication code, digest (U|P|X). In the present embodiment, a one-way hash function (e.g., SHA-1 or MD-5) is used for calculating the message authentication code. One way hash functions such as SHA-1 or MD-5 are well known in the art. It is also well known that these one-way hash functions provide protection against hacking as it is computationally infeasible for an eavesdropper to compute the digest without knowledge of the password.

At step 316, the network draws a second random number, Y, and sends the second random number together with the message authentication code to the client system.

At step 318, the client determines a concatenation (U|P|X) and calculates its own copy of the message authenticate code based on a local copy of user identifier U, password P, and the random number X. In the present embodiment, the same one-way hash function used in step 314 is used for calculating the local message digest.

Then, at step 320, the client system checks whether the network calculated message authentication code matches the one locally calculated at step 318. If the network encrypted digest does not match the locally calculated one, the network may not be the network that the user expects to access. Thus, at 330, the network is not authenticated, and the process 300 ends.

If the network calculated message authentication code and the locally calculated message authentication code match, the network indeed holds a copy of the user identifier and password. Then at step 322, the client system concatenates the user identifier U, the password P, and the random number Y, and generates another message authentication code, digest (U|P|Y).

At step 324, the client system sends the client message authentication code digest (U|P|Y) to the network.

At step 326, the network determines a concatenation (U|P|Y) and calculates a message authentication code, digest (U|P|Y), based on a local copy of user identifier U, password P, and the random number Y.

At step 328, after receiving the client message authentication code and calculating its own copy of the message authentication code, the network checks whether the two message authentication codes match.

If they match, then it can be concluded that both the client and the network possess the same password and user identifier. Hence, at step 340, the user is authenticated and is allowed to access the network resources.

However, if the digests do not match, then the client does not possess the same password and user identifier as does the network. Thus, at step 330, the user is not authenticated and access privileges to the network resources are denied. Thereafter, the "log in" process 300 ends.

The present invention, a method and system for mutual authentication of users and networks over an unsecured wireless communication channel, has thus been disclosed. While the present invention has been described in particular embodiments, it should be appreciated that the present invention should not be construed as limited by such embodiments. In particular, the secret access codes (e.g., passwords) described herein are merely an example of a secret that is shared by the network and the user. It should be appreciated that the secret may be of any arbitrary form. Further, the present invention should not be construed as applicable only to unsecured communication between a client and an access point of a wireless LAN. Rather, the present invention is applicable to other types of unsecured communication channel. For instance, the present invention is also applicable to peer-to-peer communication between users of a wireless network.

The invention claimed is:

1. In a computer system configured for remote coupling to a network via an unsecured wireless communication channel, a process for authenticating a network user comprising steps of:

a) transmitting over said unsecured wireless communication channel a user identifier to said network that is operable to look up a first secret access code associated with said user identifier and operable to generate a first hashed representation of said first secret access code;

b) receiving over said unsecured wireless communication channel said first hashed representation from said network;

c) receiving a second secret access code from said network user and generating a second hashed representation thereof;

d) verifying said first hashed representation against said second hashed representation;

e) provided that said first hashed representation and said second hashed representation match, generating a third hashed representation of said second secret access code; and f) transmitting over said unsecured wireless communication channel said third hashed representation to said network for verifying against a fourth hashed representation of said first secret access code.

2. A process as recited in claim 1 further comprising steps of:

generating a first random number; and transmitting over said unsecured wireless communication channel said first random number to said network.

3. A process as recited in claim 2 wherein said first hashed representation is generated based on a concatenation including said first secret access code and said first random number.

4. A process as recited in claim 2 wherein said second hashed representation is generated based on a concatenation including said second secret access code and said first random number.

5. A process as recited in claim 2 further comprising step of receiving a second random number from said network.

6. A process as recited in claim 5 wherein said third hashed representation is generated based on a concatenation including said second secret access code and said second random number.

7. A process as recited in claim 5 wherein said fourth hashed representation is generated based on a concatenation including said first secret access code and said second random number.

8. A process as recited in claim 1 wherein said user identifier comprises a MAC address.

9. A process as recited in claim 1 wherein said user identifier comprises a user log-in name.

10. A process as recited in claim 1 wherein said network comprises a wireless local access network.

11. A computer readable medium having stored therein computer readable codes adapted for causing a computer system to perform a process for authenticating a network user over an unsecured wireless communication channel, said process comprising steps of:

a) transmitting over said unsecured wireless communication channel a user identifier to said network that is operable to look up a first secret access code associated with said user identifier and operable to generate a first hashed representation of said first secret access code;

b) receiving over said unsecured wireless communication channel said first hashed representation from said network;

c) receiving a second secret access code from said network user and generating a second hashed representation thereof;

d) verifying said first hashed representation against said second hashed representation;

e) provided that said first hashed representation and said second hashed representation match, generating a third hashed representation of said second secret access code; and f) transmitting said third hashed representation to said network for verifying against a fourth hashed representation of said first secret access code.

12. A computer readable medium as recited in claim 11 wherein said process further comprises steps of:

generating a first random number; and transmitting over said unsecured wireless communication channel said first random number to said network.

13. A computer readable medium as recited in claim 12 wherein said first hashed representation is generated based on a concatenation including said first secret access code and said first random number.

14. A computer readable medium as recited in claim 12 wherein said second hashed representation is generated based on a concatenation including said second secret access code and said first random number.

15. A computer readable medium as recited in claim 12 wherein said process further comprises step of receiving over said unsecured wireless communication channel a second random number from said network.

16. A computer readable medium as recited in claim 15 wherein said third hashed representation is generated based on a concatenation including said second secret access code and said second random number.

17. A computer readable medium as recited in claim 15 wherein said fourth hashed representation is generated based on a concatenation including said first secret access code and said second random number.

18. A computer readable medium as recited in claim 11 wherein said user identifier comprises a MAC address.

19. A computer readable medium as recited in claim 11 wherein said user identifier comprises a user log-in name.

20. A computer readable medium as recited in claim 11 wherein said network comprises a wireless local access network.

21. In a wireless computer network access point for coupling to a wireless client computer system, a process for authenticating a network user over an unsecured wireless communication channel, said process comprising steps of:

a) receiving over said unsecured wireless communication channel a user identifier from said wireless client computer system;

b) looking up a first secret access code associated with said user identifier;

c) generating a first hashed representation of said first secret access code;

d) sending over said unsecured wireless communication channel said first hashed representation to said wireless client computer system, wherein said wireless client computer system is operable to verify said first hashed representation against a second hashed representation of a second secret access code provided by said network user;

e) receiving over said unsecured wireless communication channel a third hashed representation of said second secret access code from said wireless client computer system;

f) generating a fourth hashed representation of said first secret access code; and g) provided that said third hashed representation and said fourth hashed representation match, authenticating said network user.

22. A process as recited in claim 21 further comprising step of receiving a first random number from said wireless client computer system.

23. A process as recited in claim 22 wherein said first hashed representation is generated based on a concatenation including said first secret access code and said first random number.

24. A process as recited in claim 22 wherein said second hashed representation is generated based on a concatenation including said second secret access code and said first random number.

25. A process as recited in claim 22 further comprising steps of:

generating a second random number; and transmitting over said unsecured wireless communication channel said second random number to said wireless client computer system.

26. A process as recited in claim 25 wherein said third hashed representation is generated based on a concatenation including said second secret access code and said second random number.

27. A process as recited in claim 25 wherein said fourth hashed representation is generated based on a concatenation including said first secret access code and said second random number.

28. A process as recited in claim 21 wherein said user identifier comprises a MAC address.

29. A process as recited in claim 21 wherein said user identifier comprises a user log-in name.

30. A process as recited in claim 21 wherein said network comprises a wireless local access network.

31. A wireless network access point comprising:

a) logic for receiving over an unsecured wireless communication channel a user identifier from a wireless client computer system;

b) logic for looking up a first secret access code associated with said user identifier;

c) logic for generating a first hashed representation of said first secret access code;

d) logic for sending over said unsecured wireless communication channel said first hashed representation to said wireless client computer system, wherein said wireless client computer system is operable to verify said first hashed representation against a second hashed representation of a second secret access code provided by said network user;

e) logic for receiving over said unsecured wireless communication channel a third hashed representation of said second secret access code from said wireless client computer system;

f) logic for generating a fourth hashed representation of said first secret access code; and g) logic for authenticating said network user provided that said third hashed representation matches said fourth hashed representation.

32. A wireless network access point as recited in claim 31 further comprising logic for receiving a first random number from said wireless client computer system.

33. A wireless network access point as recited in claim 32 wherein said first hashed representation is generated based on a concatenation including said first secret access code and said first random number.

34. A wireless network access point as recited in claim 32 wherein said second hashed representation is generated based on a concatenation including said second secret access code and said first random number.

35. A wireless network access point as recited in claim 32 further comprising:

logic for generating a second random number; and logic for transmitting over said unsecured wireless communication channel said second random number to said wireless client computer system.

36. A wireless network access point as recited in claim 35 wherein said third hashed representation is generated based on a concatenation including said second secret access code and said second random number.

37. A wireless network access point as recited in claim 35 wherein said fourth hashed representation is generated based on a concatenation including said first secret access code and said second random number.

38. A wireless network access point as recited in claim 31 wherein said user identifier comprises a MAC address.

39. A wireless network access point as recited in claim 31 wherein said user identifier comprises a user log-in name.

40. A wireless network access point as recited in claim 31 wherein said network comprises a wireless local access network.

41. A wireless network comprising:

a wireless client computer system;

a wireless network access point coupled to said wireless client computer system via a wireless connection, wherein said network access point is operable to receive a user identifier from said wireless client computer system, and operable to look up a first secret access code corresponding to said user identifier, and operable to generate a first hashed representation of said first secret access code, wherein said wireless client computer system is operable to verify said first hashed representation of said first secret access code against a second hashed representation of a second secret access code provided by a network user, and operable to generate a third hashed representation of said second secret access code provided said first hashed representation is identical to said second hashed representation, and wherein said network access point is operable to generate a fourth hashed representation of said first secret access code for verifying against said third hashed representation.

42. A network as recited in claim 41 wherein said wireless client computer system is operable to generate a first random number and to transmit said first random number to said network access point.

43. A network as recited in claim 42 wherein said first hashed representation is generated based on a concatenation including said first secret access code and said first random number.

44. A network as recited in claim 42 wherein said second hashed representation is generated based on a concatenation including said second 15 secret access code and said first random number.

45. A network as recited in claim 42 wherein said network access point is adapted for generating a second random number, and adapted for transmitting said second random number to said wireless client computer system.

46. A network as recited in claim 45 wherein said third hashed representation is generated based on a concatenation including said second secret access code and said second random number.

47. A network as recited in claim 45 wherein said fourth hashed representation is generated based on a concatenation including said first secret access code and said second random number.

48. A network as recited in claim 41 wherein said user identifier comprises a MAC address.

49. A network as recited in claim 41 wherein said user identifier comprises a user log-in name.

* * * * *